Fig. 2

United States Patent Office 3,508,865
Patented Apr. 28, 1970

3,508,865
AMMONIUM POLYPHOSPHATE PRODUCED AT ATMOSPHERIC PRESSURE
Thad D. Farr, Sheffield, and Henry K. Walters, Jr., Florence, Ala., assignors to Tennessee Valley Authority, a corporation of the United States
Continuation-in-part of application Ser. No. 663,171, Aug. 24, 1967. This application Sept. 12, 1968, Ser. No. 759,308
Int. Cl. C01b 25/28, 25/38
U.S. Cl. 23—107    1 Claim

ABSTRACT OF THE DISCLOSURE

A process wherein superphosphoric acid containing $P_2O_5$ in the range of about 70 percent to about 83 percent is treated with ammonia and water at atmospheric pressure to prepare an aqueous slurry at pH about 8 that is mixed with product recycle fines and fresh acid and then ammoniated to produce dry granular products, without the need of a drying step, which have high ratios of N to $P_2O_5$ and which contain mostly ammonium ortho-, pyro-, and tripolyphosphates.

---

The invention herein described may be manufactured and used by or for the Government for governmental purposes without the payment to us of any royalty therefor.

This application is a continuation-in-part of our copending application Ser. No. 663,171, filed Aug. 24, 1967, for Ammonium Polyphosphate Produced at Atmospheric Pressure.

Our invention relates to an improved process for the production of high-analysis ammonium polyphosphate salts and more particularly to the preparation of ammonium acyclic polyphosphate salts by the ammoniation of superphosphoric acid at atmospheric pressure.

The term "superphosphoric acid" used in the specification and claims is defined as a mixture of ortho-, pyro-, and higher condensed phosphoric acids with the general formula $H_{n+2}P_nO_{3n+1}$. The distribution of the acid species varies with the $P_2O_5$ content of the superphosphoric acid. The Canadian Journal of Chemistry, vol. 34 (1956), page 790, shows that superphosphoric acid in the range 69.81 to 84.95 percent $P_2O_5$ contains the following proportions of ortho-, pyro-, and higher condensed acyclic polyphosphoric acids, expressed as percent of total phosphorus.

97.85 to 2.32 percent ortho-
2.15 to 49.30 percent pyro-
0.00 to 24.98 percent tripoly-
0.00 to 16.99 percent tetrapoly-
0.00 to 12.64 percent pentapoly-
0.00 to 9.75 percent hexapoly-
0.00 to 8.63 percent heptapoly-
0.00 to 7.85 percent octapoly-
0.00 to 6.03 percent nonapoly-
0.00 to 29.41 percent higher polymers.

Acids of the above type are available from commercial sources of electric-furnace superphosphoric acid plants and may be produced with $P_2O_5$ contents ranging from about 74 to about 83 percent by a process described in U.S. Patent 3,015,540, Striplin.

Our invention is especially valuable in the production of solid ammonium polyphosphate by the atmospheric ammoniation of superphosphoric acid of any practical $P_2O_5$ content higher than about 70 percent. Either electric-furnace acid or concentrated wet-process acid can be used. If concentrated wet-process phosphoric acids are desired, they can be produced by concentrating ordinary merchant-grade wet-process phosphoric acid containing approximately 54 weight percent $P_2O_5$ and also containing incidental metallic impurities ranging from about 1 to 10 percent by a dehydration process to remove water from the merchant-grade wet-process phosphoric acid and increase its $P_2O_5$ content up into the wet acid super range of about 60 percent to about 80 percent $P_2O_5$ by a process such as that described in the copending application Ser. No. 835,377, Getsinger, assigned to the assignee of the present invention, and also described in U.S. Patent 3,192,013. When using such wet-process phosphoric acid, the distribution of the acid species therein has been observed to be somewhat different from that which would result if highly concentrated substantially pure furnace acid were used.

Heretofore a method for the production of ammonium polyphosphate has been described in U.S. Patents 3,171,733 and 3,228,752, Hignett et al. In this prior process, superphosphoric acid, either wet-process or electric-furnace type, is treated with gaseous ammonia in a reactor under a pressure of about 25 to about 1000 p.s.i.g. and a temperature of 365° to 450° F., the molten material is discharged from the reactor and is granulated by mixing with recycle fines in a pugmill, and the granules are cooled and then screened to separate particles of the desired size for product. The products had compositions ranging from 12.9 to 18.3 percent N and 59.2 to 64.2 percent $P_2O_5$, which corresponds to a degree of ammoniation ranging from 4.9 to 7.5 pounds $NH_3$ per unit (20 pounds) $P_2O_5$. The product is composed of two major phases, monoammonium orthophosphate and triammonium pyrophosphate, and a minor phase diammonium pyrophosphate; the phosphate is divided about equally between ortho and non-ortho forms. Some of the products from this pressure process, however, have had some outstanding disadvantages. It has a relatively low degree of ammoniation as compared to 9.6 pounds $NH_3$ per unit $P_2O_5$ in diammonium orthophosphate or in tetraamonium pyrophosphate. Another disadvantage is that it will cake in storage unless conditioned; the caking characteristics have been attributed to the instability of one of its major phases.

Another method for preparing solid ammonium phosphates of unspecified distribution of phosphate species by ammoniating concentrated wet-process orthophosphoric acid ($P_2O_5$ content between 68.6 and 80 percent) at 70° C. to 225° C. to provide at least 0.14 part N per part P is described in U.S. Patents 3,241,946 and 3,243,279, D. C. Young. Young states: "The exact nature of the ammonium phosphate products is not known with certainty. It is believed, however, that the major proportion of the product is a mixture of ammonium orthophosphates and ammonium polyphosphates with the presence of some P-N bonds, e.g., phosphoamido and phosphoimido compounds." Young does not specify how acid concentration, temperature, pH, and water content affect the distribution of phosphate species in such products, whereas, in the present application we do specify and give examples of the effects of acid concentration, temperature, pH, and water content on the distribution of phosphate species in the solid products obtained. Furthermore, Young does not teach, as we do, how these process variables may be controlled to obtain solid products with a high degree of ammoniation and with a desirable combination of orthophosphate and condensed phosphates.

It is therefore an object of the present invention to provide such process wherein superphosphoric acids containing $P_2O_5$ in the range of about 70 to about 80 percent are treated with ammonia and water at atmospheric pressure to prepare intermediate aqueous slurries at pH about 8 that are granulated with recycle and dried to produce final granular products which contain all the $P_2O_5$ that was in the starting acid, which have relatively high ratios of N to $P_2O_5$, which contain mostly ammonium ortho-, pyro-, and tripolyphosphates, and which have good handling and storage properties.

Another object of the present invention is to provide a process wherein superphosphoric acid containing more than about 80 percent $P_2O_5$ is ammoniated and hydrolyzed under specified conditions to prepare an intermediate slurry at pH about 8 that is granulated with recycle and dried to produce final granular products which contain all the $P_2O_5$ that was in the starting acid, which have relatively high ratios of N to $P_2O_5$, which consist mostly of ammonium ortho-, pyro-, and tripolyphosphates, and which have good handling and storage properties.

A still further object of the present invention is to provide such processes for the production of salts and/or solutions from electric-furnace superphosphoric acids for ues as fertilizers, or these products may preferably be considered as high-purity intermediates for special use such as inorganic builders in detergent formulations, as reagent chemicals, as medicinal and dental preparations, etc.

Another object of the present invention is to provide a process whereby impure superphosphoric acids such as concentrated wet-process phosphoric acids are ammoniated at atmospheric pressure to produce high-analysis products that may preferably be used as a fertilizer.

Still another object of the present invention is to provide such processes in which the ammoniation of superphosphoric acids is carried out economically at atmospheric pressure with conventional equipment.

A further object of the present invention is to provide a process wherein superphosphoric acid containing $P_2O_5$ in the range of about 70 percent to about 83 percent is treated with ammonia and water at atmospheric pressure to prepare an aqueous slurry at pH about 8 that is mixed with product recycle fines and fresh acid and then ammoniated to produce dry granular products without external heat, which have high ratios of N to $P_2O_5$, and which contain mostly ammonium ortho-, pyro-, and tripolyphosphates.

Still further and more general objects and advantages of the present invention will appear from the more detailed description set forth, it being understood, however, that this more detailed descripiton is given by way of illustration and explanation only and not by way of limitation, since various changes therein may be made by those skilled in the art without departing from the spirit and scope of the present invention.

In carrying out the objects of our invention in but several preferred forms thereof, we provide for the ammoniation of superphosphoric acids at atmospheric pressure to proceed in one or more stages and the resulting intermediate slurries are subsequently granulated to produce granules of ammonium polyphosphates which contain all the $P_2O_5$ that was originally present in the starting acid, solutions which contain all the $P_2O_5$ that was originally present in the starting acid, or suspensions which contain all the $P_2O_5$ that was originally present in the starting acid. The number of processing steps depends on the kind and composition of the superphosphoric acid that is used, and by the product that is desired, as will be disclosed in the subsequent detailed description.

Our invention, together with further objects and advantages thereof will be better understood from a consideration of the following descriptions taken in connection with the accompanying drawings in which:

FIGURE 2 is a flowsheet generally illustrating the principles of our process in one embodiment thereof, which results ultimately in the production of the desired high-analysis granular ammonium polyphosphates and solutions by the atmospheric-pressure ammoniation of superphosphoric acid preferably containing less than about 80 percent $P_2O_5$.

Figure 1:
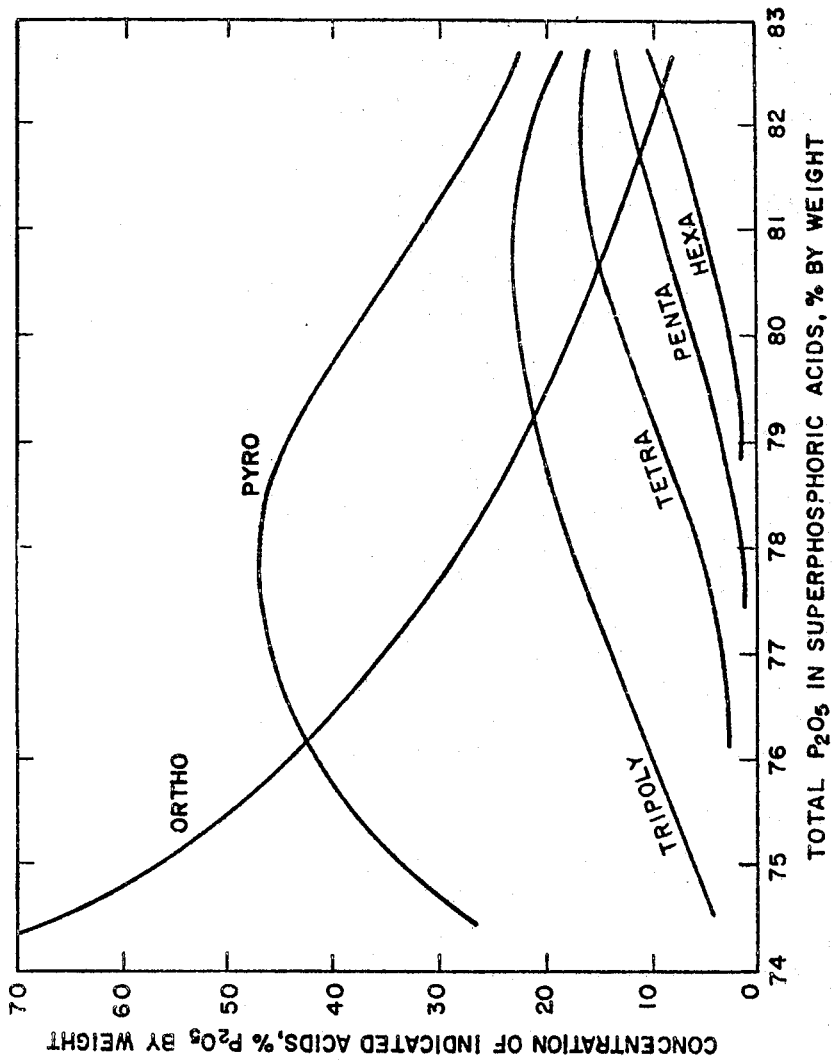
FIGURE 1 is a graphical illustration showing the distribution of the principal acid species in commercially available electric-furnace superphosphoric acids which were used in the development of our process.
Figure 3:
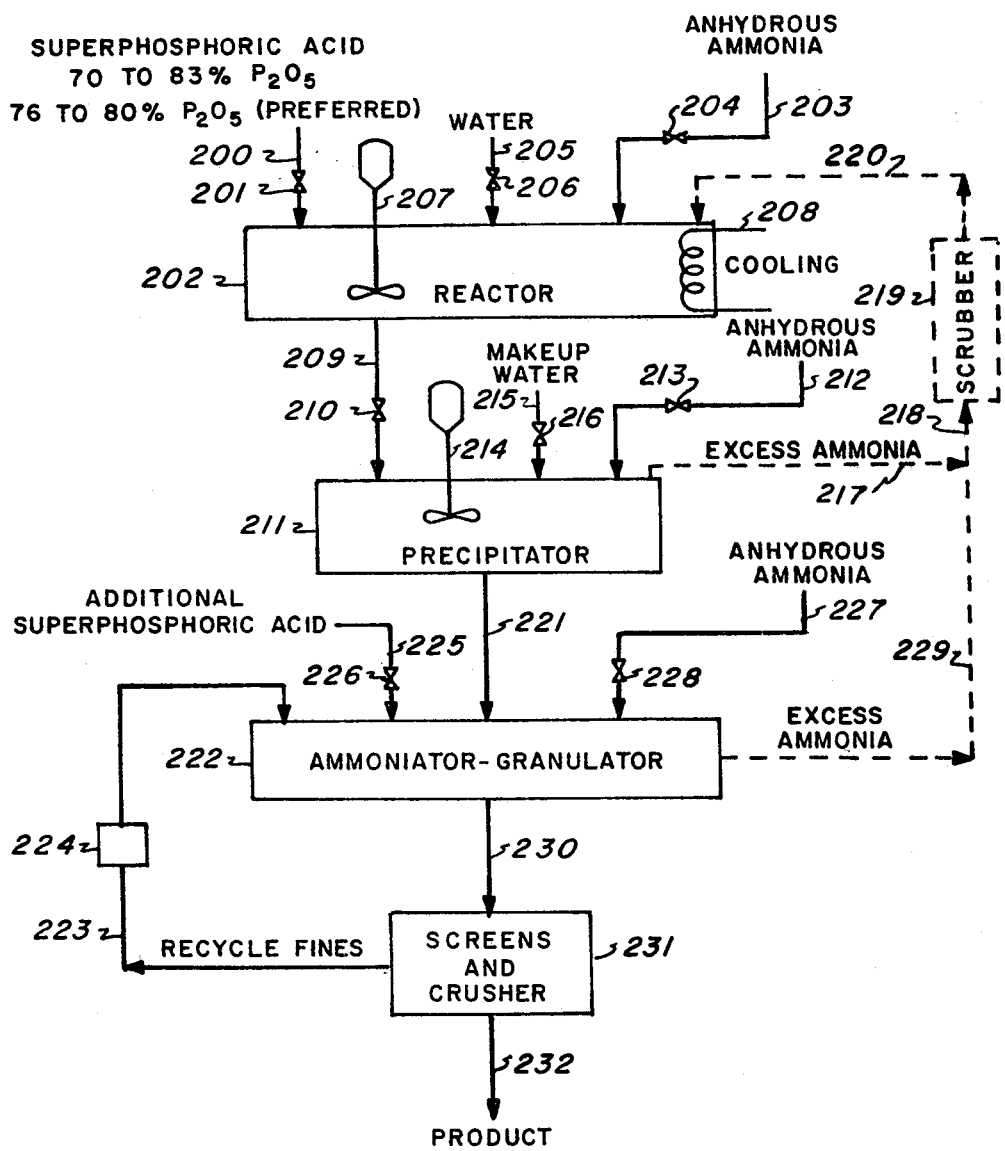
FIGURE 3 is a flowsheet generally illustrating the principles of our process, in an embodiment thereof, in which superphosphoric acids containing $P_2O_5$ in the range of about 70 percent to about 83 percent are ammoniated at atmospheric pressure to produce intermediate slurries which are then used to produce dry granular, high-analysis ammonium polyphosphate without the use of external heat.

Referring now specifically to FIGURE 3, for a modification of our process for the preparation of dry granular, high-analysis ammonium polyphosphate without the use of external heat, superphosphoric acid from a source not shown is fed through line 200 and any suitable means 201 for controlling the rate of flow into reaction vessel 202. Anhydrous ammonium from a source not shown is fed into vessel 202 through line 203 and means 204 for controlling the rate of flow. Water from a source not shown is fed into vessel 202 through line 205 and means 206 for controlling the rate of flow. Vessel 202 is equipped with a pH meter, not shown, and motor-driven agitator 207 to provide rapid and intimate mixing of acid, water, and ammonia. The three reactants are added simultaneously and at such rates to form an intermediate solution with pH in the range from about 5 to about 7 and which will contain more than about 33 weight percent total ($N+P_2O_5$). Vessel 202 is also equipped with cooling coils 208 to control the temperature of the solution in the range of about 50° C. to about 80° C. Under these conditions, hydrolysis of the nonortho species in the starting acid is minimized and the distribution of the phosphate species in the solution is similar to that in the acid. When it is desired to use acid containing more than about 80 percent $P_2O_5$, the phosphate species more condensed than tripolyphosphate are hydrolyzed, as described in other embodiments of our invention disclosed in our parent application, Ser. No. 663,171, filed Aug. 24, 1967, so that the proportion of these longer chain species in the acid is reduced to about 15 percent or less. We prefer to introduce the superphosphoric acid and water at fixed rates according to the capacity of the equipment and to vary the rate of introduction of anhydrous ammonia as may be necessary to maintain the desired pH of the solution.

The solution is discharged from reaction vessel 202 through line 209 and any suitable means 210 for controlling the rate of flow to precipitation vessel 211. Anhydrous ammonia from a source not shown is fed into vessel 211 through line 212 and means 213 for controlling the rate of flow. Precipitation vessel 211 is equipped with a pH meter not shown and motor-driven agitator 214 running at such speed as to obtain rapid and intimate mixing of the anhydrous ammonia and the solution from reactor 202. The solution and anhydrous ammonia are added simultaneously at rates to maintain a slurry in the pH range of about 7.4 and 8.9 and a gross composition of more than about 45 weight percent total ($N+P_2O_5$), or preferably, about 13 to about 16 percent N and about 35 to about 42 percent $P_2O_5$. We prefer to introduce the solution from vessel 202 to vessel 211 at a steady rate to have an average retention time in excess of about 5 minutes and to vary the rate of introduction of anhydrous ammonia so as to introduce a slight excess of that necessary to maintain the desired pH of the resultant slurry. The precipitation step is done without cooling and its temperature will vary from about 50° C. to about 110° C., depending upon the temperature of the incoming solution and the amount of excess ammonia used. Water may be added, via line 215 and means of control of flow 216, to adjust the viscosity and to maintain the water content of the hot slurry in the range of about 20 to about 47 percent. The unreacted ammonia and any water evaporated from precipitator vessel 211 may be recycled to reactor 202 via lines 217, 218, scrubber 219, and line 220.

The slurry from precipitation vessel 211 is discharged through line 221 to ammoniator-granulator 222 where it is mixed with recycle fines of the final product, additional superphosphoric acid, and anhydrous ammonia, added via lines 223, 225, and 227 and by flow control means 224, 226, and 228, respectively, for controlling the proportions of each of the feed materials. The temperatures of the slurry, the product recycle fines, and the additional acid are normally at or above 70° C. so that the heat of ammoniation of the acid raises the temperature of the mixture further to evaporate the free water in the slurry and, as a consequence, no external heat is required to produce a dry granular product. We prefer to add a slight excess of ammonia to the ammoniator-granulator to ensure complete ammoniation of the additional acid. The unreacted ammonia and the water evaporated from the ammoniator-granulator may be recycled to reactor 202 via line 229, line 218, scrubber 219, and line 220. We have found that when the $P_2O_5$ added as acid amounts to about 10 percent of that in the slurry-recycle feed, sufficient heat is produced during ammoniation to dry a slurry-acid-recycle mixture containing 7 percent free water. The amount of acid added during granulation is a variable that depends on the moisture content of the slurry-recycle mixture, which is controlled by the proportion of dry product recycle used in the granulation mixture. The dry product passes from ammoniator-granulator 222 via line 230 to screens and crusher assembly 231 where the oversize granules are sized to meet product specifications; the product fines, produced in sufficient quantity, are returned to ammoniator-granulator 222, as described previously. The onsize granular product, discharged via line 232 to storage, contains about 17 to about 21 percent nitrogen and about 52 percent to about 60 percent $P_2O_5$, and consists mostly of ammonium ortho-, pyro-, and tripolyphosphates. The weight ratio $N:P_2O_5$ and distribution of phosphate species in the granular product depends upon the composition of the acid and the processing conditions used.

In order that those skilled in the art may better understand how the present invention can be practiced, the following examples of specification applications are given by way of illustration but not by way of limitation. Bench-scale tests of the several methods described above were made batchwise or continuously with electric-furnace superphosphoric acids with $P_2O_5$ contents ranging from about 75 to about 83 percent. Tests also were made with wet-process acids that had been concentrated thermally to $P_2O_5$ contents of (1) about 71 percent from "black" commercial acid (about 52 percent $P_2O_5$) produced from uncalcined phosphate rock, and (2) about 74 percent from "green" commercial acid (about 52 percent $P_2O_5$) produced from calcined phosphate rock.

For the reader's convenience, attention is directed to the fact that of the four following Examples A through D, Example D is specifically directed to the particular embodiment to which the instant invention is specifically directed, whereas Examples A, B, and C include other embodiments of our invention referred to in our parent application, supra. We feel, however, that Examples A–C will be useful to the reader by means of reference thereto for background information relied upon in our Example D. Examples A, B, and C contain specific detailed directions for carrying out particular steps referred to in Example D and are included to make our present embodiment clearer.

EXAMPLE A

Figure 2:
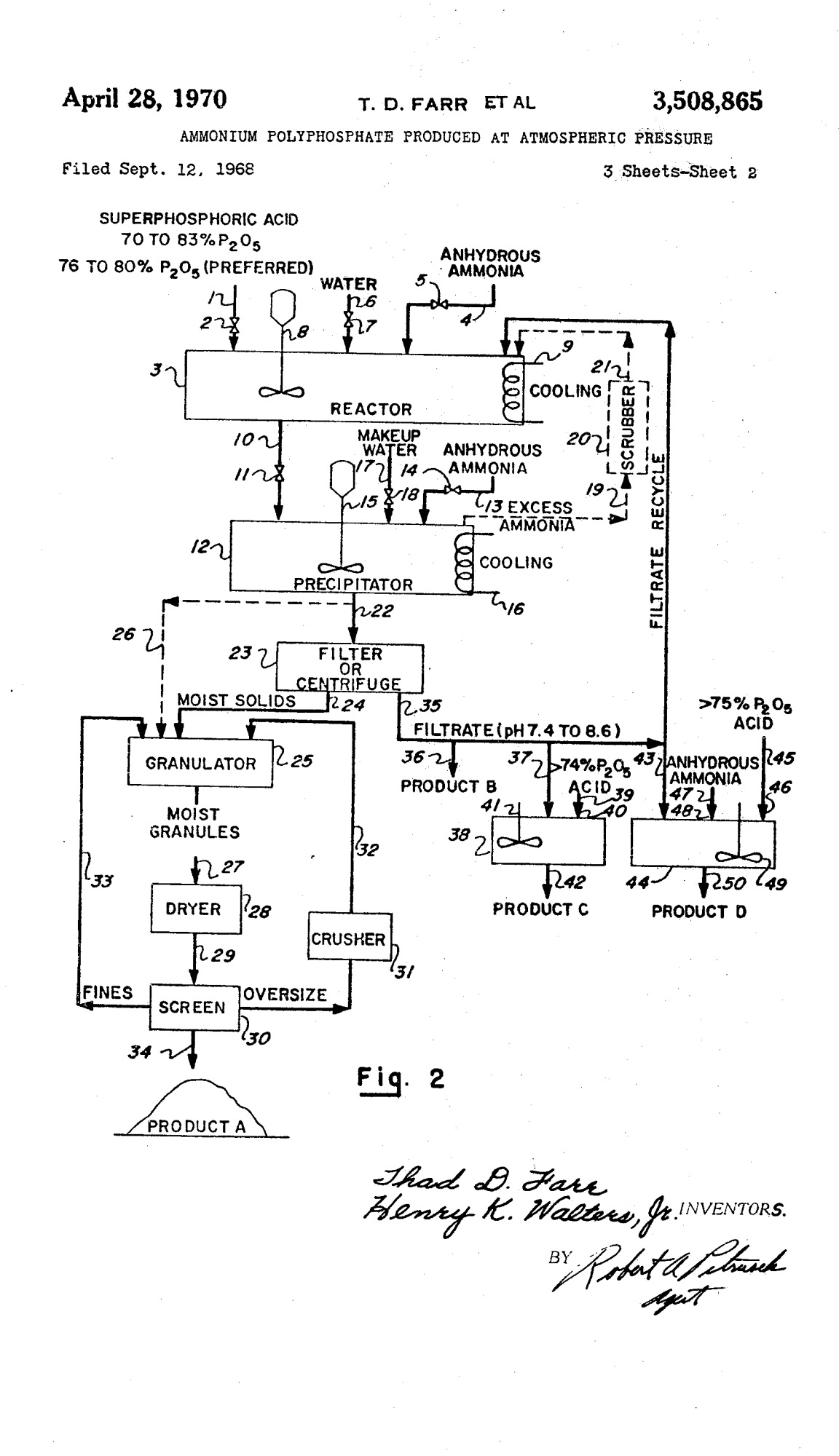

In another test of our process, superphosphoric acid containing 79.6 percent $P_2O_5$ was combined with anhydrous ammonia and water as shown schematically in FIGURE 2. The temperature was maintained at about 70° C. and the pH at about 6 while producing continuously a stock solution that contained 11.4 percent N and 37.5 percent $P_2O_5$. For a starting slurry, 360 ml. of the stock solution was ammoniated batchwise in an insulated precipitation vessel (volume, 360 ml.) fitted with a stirrer and an overflow line. The batch of stock solution was ammoniated from an initial pH of 6 up to 8.6 in about 25 minutes while the temperature rose from 25° to 60° C. Continuous preparation of slurry was then started with the operating conditions and results shown in Table I below.

The granular product had good physical properties, remaining dry and free flowing after extended periods of storage.

TABLE I.—TEST NO. 11B

| | |
|---|---|
| Feed rate, g./min. | |
| Stock solution | 18 |
| Anhydrous ammonia | Small excess |
| Temperature of feed solution, ° C. | 71 |
| Precipitator: | |
| Temperature, ° C. | 66 |
| pH of slurry | 7.4 |
| Average retention time of slurry, min. | 45 |
| Discharge rate, g./min. | 15 |
| Time of operation, min. | 205 |
| Slurry composition: | Percent |
| N | 14.8 |
| $P_2O_5$ | 41.7 |
| Lb. $NH_3$/unit $P_2O_5$ | 8.6 |
| Granulation of slurry: | |
| Wt. ratio of recycle fines to slurry | 4 |
| Drying temp., ° C. | 66 |
| Composition of granular product: | Percent |
| N | 19.5 |
| $P_2O_5$ | 58.3 |
| Free $H_2O$ | 0.3 |
| Lb. $NH_3$/unit $P_2O_5$ | 8.1 |

EXAMPLE B

Another test of the embodiment referred to in Example A, supra was made to determine the stability of the granular product when recycled under conditions similar to those normally found in plant granulation and drying procedures.

About 5 pounds of product was made by granulating the slurry that was prepared by the procedure described in Example 10 of our parent application Ser. No. 663,171, referred to supra; the granular product made in the same test was used as starting recycle material. The slurry contained approximately 14 percent N and 37 percent $P_2O_5$.

The starting recycle was mixed with a portion of the slurry at a weight ratio of 4 parts to 1 part of slurry. The mixture was stirred manually until homogeneous and then dried at 66° C. This process was repeated eight times (recycle ratios of 3 or 4) to produce 2149 grams of dry granular product. The eight successive granulation steps are shown in Table II below.

TABLE II.—TEST NO. LP-5

| Granulation step | Feed to granulation, g. | | Product, g. | | |
|---|---|---|---|---|---|
| | | | Mesh size | | |
| | Dry recycle | Slurry | −6 +12 | −12 | Total |
| 1 | 640 | 160 | | | 744 |
| 2 | 744 | 186 | | | 876 |
| 3 | 876 | 219 | | | 1,004 |
| 4 | 1,004 | 251 | | | 1,143 |
| 5 | 1,143 | 286 | 1,106 | 215 | 1,321 |
| 6 | 1,321 | 84 | 1,212 | 165 | 1,377 |
| 7 | 1,377 | 458 | 1,407 | 258 | 1,665 |
| 8 | 1,665 | 555 | 1,833 | 183 | 2,016 |
| 9 | 2,016 | 209 | 2,067 | 82 | 2,149 |

The compositions of the initial recycle material and the final product are given in Table III below.

TABLE III.—COMPOSITION OF GRANULES, EXAMPLE B

|  | Composition, Percent | | | | Distribution, Percent, P₂O₅ | | | |
| --- | --- | --- | --- | --- | --- | --- | --- | --- |
|  | N | P₂O₅ | Lb. NH₃/ unit P₂O₅ | Free H₂O | Ortho | Pyro | Tri | Other |
| Initial recycle | 21.4 | 56.0 | 9.3 | 0.1 | 40 | 50 | 9 | 1 |
| Final product | 21.3 | 55.8 | 9.3 | 0.2 | 42 | 48 | 9 | 1 |

The results show that the composition and phosphate distribution were not changed when the granular product was prepared by a multiple recycle process of granulation and drying.

EXAMPLE C

Other tests of the embodiment referred to in Examples A and B, supra were made to determine the effect of ammoniation temperature on the distribution of phosphate species in the slurries obtained at high pH. The starting solution in these tests was prepared from superphosphoric acid by the procedure shown schematically in FIGURE 2; the distribution of phosphate species in this stock solution was essentially the same as that in the acid used. Portions of this stock solution (pH 6.1) were treated with anhydrous ammonia at different temperatures to form three batches of slurry at pH about 8.5. In tests 9A and 9B, the starting temperatures were 64° and 27° C., respectively, and no heat was removed intentionally from the insulated reaction vessel while ammoniating the solution from pH 6.1 to 8.4. In test 9C, the temperature was controlled in the range 15° to 20° C. by cooling the reaction vessel in a chilled water bath.

The results, summarized in Table IV below, show that ammoniation temperatures in the range likely to be encountered in plant-scale operation had no effect on the distribution of phosphate species in the slurries. In carrying out this step of our process, therefore, it is not necessary to have rigid temperature control during the second ammoniation step.

TABLE IV.—EFFECT OF TEMPERATURE, EXAMPLE C

|  | Starting acid | Starting solution | Ammoniated slurries | | |
| --- | --- | --- | --- | --- | --- |
|  |  |  | 9A | 9B | 9C |
| Ammoniation temp., ° C.: |  |  |  |  |  |
| Initial |  |  | 72 | 64 | 27 | 15 |
| Maximal |  |  | 72 | 64 | 54 | 20 |
| Terminal |  |  | 72 | 44 | 46 | 19 |
| Final pH |  |  | 6.1 | 8.4 | 8.4 | 8.5 |
| Composition, percent: |  |  |  |  |  |
| N |  |  | 11.3 | 14.2 | 13.5 | 13.7 |
| P₂O₅ | 79.6 | 37.6 | 38.8 | 37.4 | 36.2 |
| Distribution, percent, of P₂O₅: |  |  |  |  |  |
| Ortho | 21 | 23 | 25 | 24 | 23 |
| Pyro | 44 | 41 | 37 | 39 | 39 |
| Tripoly | 21 | 22 | 23 | 23 | 23 |
| Tetrapoly | 10 | 9 | 8 | 9 | 9 |
| Pentapoly | 3 | 4 | 3 | 3 | 3 |
| Other | 1 | 1 | 4 | 2 | 3 |

EXAMPLE D

Small scale tests of the instant modification of our invention which is specifically illustrated in FIGURE 3 were made to determine whether ammoniation of a mixture of slurry, superphosphoric acid, and product recycle fines would produce dry granular ammonium polyphosphate without the use of external heat.

In the tests, superphosphoric acid (77 to 80 percent P₂O₅) was combined with ammonia and water as described in Example A to prepare the intermediate solution. The intermediate solution (from the first reactor) was further ammoniated to pH about 8.5 to prepare the intermediate slurry as described in Example C, Test 9A. In the initial batch tests of the ammoniator-granulator step, 5 parts of the slurry, 15 parts of product recycle fines (prepared as described in Example B), and 1.5 parts of superphosphoric acid were mixed and treated with a slight excess of anhydrous ammonia in an insulated vessel for 15 minutes. When the starting temperature of the slurry-acid-recycle mixture was 25° C., the temperature rose to 55° C. during the ammoniation and the moisture content of the mixture decreased from about 7 percent to about 4 percent. When the starting temperature of the mixture was 55° C. the maximum temperature during ammoniation was 73° C. and the final moisture content was 2 percent.

Since it would be feasible in plant operation to add the slurry, acid, and recycle to the ammoniator-granulator at or above 70° C., the heat of ammoniation of the acid would raise the temperature further to promote rapid drying of the product. Other tests were made therefore in which similar mixtures were ammoniated in an open vessel partly immersed in a bath maintained at 70° or 105° C. The mixtures of 5 parts slurry, 15 parts of recycle, and 1.5 parts of acid were weighed into the vessel at 25° C.; the P₂O₅ added as acid was equivalent to about 10 percent of that in the granulation mixture. The vessel was placed in the bath, the addition of anhydrous ammonia was started immediately, and the mixture was stirred during the 10 or 15 minutes of ammoniation. The mixtures granulated easily under these conditions.

Compositions of the ammoniator-granulator feed and products of two typical tests are shown in Table V below. The moisture content of the slurry-acid-recycle mixtures was about 7 percent; the moisture content of the products was 1 percent or less at both temperatures. In the test where the granulation vessel was in the 70° C. bath, the temperature of the slurry-acid-recycle mixture rose to 72° C. during the ammoniation, which indicates that the heat of ammoniation of the acid will produce a dry granular product without the use of external heat. The dry granular products contained about 21 percent nitrogen and 55 percent P₂O₅, which corresponds to 9.3 pounds NH₃ per unit of P₂O₅; the P₂O₅ was distributed as ortho-40, pyro-48 to 50, tripoly-9 to 11, and more highly condensed phosphates 1 percent. The products had good physical properties.

TABLE V.—TESTS OF AMMONIATOR-GRANULATOR STEP

[Granulation feed: 5 parts slurry, 15 parts recycle fines, 1.5 parts acid]

|  | Ammoniation-Granulation [1] | | Composition, percent | | | Distribution, percent of P₂O₅ | | | |
| --- | --- | --- | --- | --- | --- | --- | --- | --- | --- |
|  | Max. temp., ° C. | Time, min. | N | P₂O₅ | Free H₂O | Ortho | Pyro | Tripoly | Other |
| Superphosphoric acid |  |  |  | 79.4 |  | 19 | 42 | 22 | 17 |
| Slurry [2] |  |  | 13.9 | 37.6 | 30.0 | 38 | 46 | 14 | 2 |
| Recycle fines |  |  | 21.4 | 55.8 | 0.8 | 43 | 49 | 8 | 0 |
| Products | 72 | 15 | 21.1 | 54.9 | 1.0 | 40 | 48 | 11 | 1 |
|  | 100 | 10 | 21.1 | 55.6 | 0.6 | 40 | 50 | 9 | 1 |

[1] Initial temperature of feed was 25° C.; the granulation vessel was partially immersed in 70° or 105° C. bath during ammoniation
[2] Prepared from superphosphoric acid containing 77 percent P₂O₅.

While we have shown and described particular embodiments of our invention, modifications and variations thereof will occur to those skilled in the art. We wish it to be understood, therefore, that the appended claim is intended to cover such modifications and variations that are within the true scope and spirit of the invention.

What we claim as new and desire to secure by Letters Patent of the United States is:

1. An improved fully integrated continuous process for the production of granular ammonium polyphosphate which comprises the steps of, at atmospheric pressure:

(1) simultaneously introducing a stream of superphosphoric acid (about 76 to about 80 percent $P_2O_5$) and streams of anhydrous ammonia and water into a first reaction zone; therein rapidly and intimately mixing said streams; controlling the proportion of said superphosphoric acid and said anhydrous ammonia and water introduced into said first reaction zone such that the reaction product formed therein (a) is maintained in the temperature range of about 50° to about 80° C., (b) has a pH in the range from about 5 to about 7, and (c) contains more than about 33 weight percent total $(N+P_2O_5)$;

(2) withdrawing a stream of the reaction product from said first reaction zone and introducing said withdrawn stream of reaction product into a second reaction zone, together with a stream of anhydrous ammonia and a stream of makeup water added to maintain the water content of the mixture in the range of about 20 to about 47 percent; maintaining the temperature in said second reaction zone in the range of about 50° C. to about 110° C.; controlling the relative proportions of anhydrous ammonia and reaction product added to said second reaction zone to raise the pH therein to within the range of about 7.4 to about 8.9, said pH adjustment sufficient to form in said second reaction zone a slurry containing more than about 45 weight percent total $(N+P_2O_5)$;

(3) retaining said slurry in said second reaction zone for an average retention time in excess of about 5 minutes; and (4) withdrawing a stream of said slurry from said second reaction zone and introducing said stream of slurry directly to an ammoniator-granulator wherein the said slurry is mixed with product recycle fines, anhydrous ammonia and additional superphosphoric acid in an amount which on ammoniation produces sufficient heat to evaporate the free water in the mixture and recover therefrom, without the addition of external heat therein, a dry solid product containing by weight from about 17 percent to about 21 percent nitrogen and from about 52 percent to about 60 percent $P_2O_5$, and consisting of substantially ammonium orthophosphates, ammonium pyrophosphates, and ammonium tripolyphosphates.

References Cited

UNITED STATES PATENTS

| | | | |
|---|---|---|---|
| 2,913,329 | 11/1959 | Geiersberger et al. | 71—37 |
| 3,243,279 | 3/1966 | Young | 71—43 |
| 3,382,059 | 5/1968 | Getsinger | 71—34 |

OSCAR R. VERTIZ, Primary Examiner

G. A. HELLER, Assistant Examiner

U.S. Cl. X.R.

71—43, 34